Figure 1:
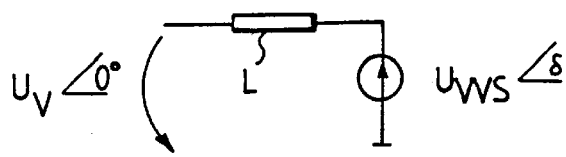

United States Patent

Harmoinen et al.

[11] Patent Number: 5,940,286
[45] Date of Patent: *Aug. 17, 1999

[54] METHOD FOR CONTROLLING THE POWER TO BE TRANSFERRED VIA A MAINS INVERTER

[75] Inventors: Martti Harmoinen, Espoo; Vesa Manninen, Helsinki; Pasi Pohjalainen, Helsinki; Pekka Tiitinen, Helsinki, all of Finland

[73] Assignee: ABB Industry OY, Helsinki, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/737,534

[22] PCT Filed: May 9, 1995

[86] PCT No.: PCT/FI95/00246

§ 371 Date: Nov. 12, 1996

§ 102(e) Date: Nov. 12, 1996

[87] PCT Pub. No.: WO95/31857

PCT Pub. Date: Nov. 23, 1995

[30] Foreign Application Priority Data

May 13, 1994 [FI] Finland ................. 942255

[51] Int. Cl.$^6$ ................. H02M 7/515
[52] U.S. Cl. ............. 363/98; 363/132; 318/432; 318/807
[58] Field of Search ................. 318/799, 801, 318/807, 432; 363/35, 37, 97, 98, 17, 132

[56] References Cited

U.S. PATENT DOCUMENTS

| | | |
|---|---|---|
| 4,673,858 | 6/1987 | Saito . |
| 4,894,765 | 1/1990 | Kahkipuro ................. 363/124 |
| 4,905,135 | 2/1990 | Unehara et al. ................. 363/98 |
| 5,038,092 | 8/1991 | Asano et al. . |
| 5,334,923 | 8/1994 | Lorenz et al. ................. 318/807 |
| 5,481,168 | 1/1996 | Mutoh et al. ................. 318/802 |
| 5,585,708 | 12/1996 | Richardson et al. ................. 318/807 |

FOREIGN PATENT DOCUMENTS

| | | |
|---|---|---|
| 0165020 | 6/1985 | European Pat. Off. . |
| 0175154 | 8/1985 | European Pat. Off. . |
| 0351783 | 7/1989 | European Pat. Off. . |
| 0371442 | 11/1989 | European Pat. Off. . |
| 0535281 | 11/1991 | European Pat. Off. . |
| 63-186596 | 8/1988 | Japan . |
| 3173388 | 7/1991 | Japan . |

*Primary Examiner*—Peter S. Wong
*Assistant Examiner*—Derek J. Jardieu
*Attorney, Agent, or Firm*—Watson Cole Grindle Watson P.L.L.C.

[57] ABSTRACT

The present invention relates to a method for controlling the power to be transferred via a mains inverter, the mains inverter (VVS) being arranged to transfer electric power in both directions between the n-phase AC main system (U) and the DC intermediate circuit (1). According to the method, the power desired to be transferred is controlled by defining reference values (Tref, Vvvs-ref) for the torque and flux of the mains inverter and comparing them with the actual values (T, Vvvs) of the corresponding variables in order to generate signals adjusting the switch positions of the mains inverter in the direction increasing or decreasing the flux and correspondingly in the direction increasing or decreasing the torque, said actual values being determined by determining the position and length of the current vector (I) of the mains inverter by measuring the current (Ia, Ic) of n−1 phases of the AC main system, determining the flux (Vvvs) generated by the mains inverter as an integral of the voltage vector defined on the basis of the voltage measurement (Uc) of the intermediate circuit and data on the switch positions of the mains inverter, and determining the torque (T) generated by the mains inverter as a cross product of said current vector (I) and said flux vector (Vvvs).

5 Claims, 2 Drawing Sheets

METHOD FOR CONTROLLING THE POWER TO BE TRANSFERRED VIA A MAINS INVERTER

The present invention relates to a method for controlling the power to be transferred via a mains inverter, the mains inverter being connected to a DC intermediate circuit on the one hand and to an n-phase AC mains via reactors on the other hand, the frequency and amplitude of the voltage of which AC mains the mains inverter cannot affect independently; the mains inverter comprising n branches with appropriate switches and being arranged to transfer electric power in both directions between the n-phase AC mains and the DC intermediate circuit.

In accordance with what has been presented above, the present invention relates to a method for controlling a mains inverter, which is connected between an AC mains and a DC intermediate circuit. Typically, this DC intermediate circuit supplies the inverter, which supplies one or more electric motors. In an arrangement of this type, the power is supplied most typically from the electrical network to the motor, but for instance when the motor is decelerated, situations may occur in which it is necessary to transfer electric energy also from the load to the electric network via the DC intermediate circuit.

Figure 2:
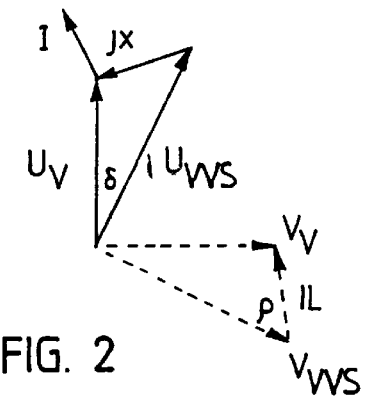

The situation described theoretically above can be illustrated by the diagram shown in FIG. 1 of the accompanying drawing as well as by the pointer drawing shown in FIG. 2 of the drawing. It is conceivable that the AC electromotive force existing in the electric network is produced in the generators supplying the electric network when the magnetic flux located on the generator shaft rotates as surrounded by the winding located in the generator. The voltage created in the winding of the generator can be expressed by formula (1).

$$\underline{Uv} = \frac{d\,\underline{Vv}}{dt} \quad (1)$$

Correspondingly, the flux generated by the voltage is obtained by integrating the voltage with respect to time according to formula (2).

$$Vv = \int Uv\,dt + V0 \quad (2)$$

If the length abs (Uv) of the voltage vector is approximately constant, the length abs (Vv) of the flux vector is also constant. The voltage, a variable characteristic of the AC system, thus also unequivocally represents the flux generated by it when the angular frequency of the vectors is defined. As shown in FIG. 2, the flux Vv is in a phase shift of 90° with respect to the voltage Uv.

In connecting another electromotive source to the electromotive force of the AC mains described above, the voltage of which source is Uvvs via reactor L, as shown in FIG. 1, the effective power transferring between these two systems can be described by means of equation (3).

$$p = UvUvvs/X \sin \delta \quad (3)$$

in which $X = \omega L$. Equation (3) shows that angle difference $\delta$ between the voltage vectors is a precondition for a power transfer between two electromotive forces, this angle difference being also shown in FIG. 2.

As is generally known, power P can be expressed as a product of torque and angular speed. In the case described above, angular speed $\omega$ is the value of the angular speed calculated on the basis of the frequency of the AC electromotive power of the AC mains. The torque can be determined according to the known formula (4).

$$|T| = |Vv \times i| \quad (4)$$

Thus, a connection between equation (4) utilized in the theory of AC motors and power equation (3) utilized in the theory of electricity transmission is determined. Since the effective power transferring between the systems is in balance in the stationary state, equation (4) can also be expressed by means of the flux Vvvs of another electromotive force in the form of formula (5).

$$|T| = |Vvvs \times i| \quad (5)$$

On the basis of what has been presented above, it is apparent that if one desires to transfer power P between two electromotive systems, it is only necessary to define current vector I unequivocally on the basis of the calculations and calculate the position and magnitude of the flux vector by integrating the voltage vector according to formula (2) in either of the electromotive systems. The method according to the invention for controlling the DC level of the intermediate circuit of the mains inverter, this method being based on the above-mentioned principle, is characterized in that the power desired to be transferred via a mains inverter is controlled by defining reference values for the torque and flux of the mains inverter and comparing them with the actual values of the corresponding variables in order to generate signals directing the switch positions of the mains inverter in the direction increasing or decreasing the flux and correspondingly in the direction increasing or decreasing the torque, said actual values being determined by determining the position and length of the current vector of the mains inverter by measuring the current of n-1 phases of the AC mains, determining the flux generated by the mains inverter as an integral of the voltage vector defined on the basis of the voltage measurement of the intermediate circuit and data on the switch positions of the mains inverter, and determining the torque generated by the mains inverter as a cross product of said current vector and said flux vector.

Figure 3:
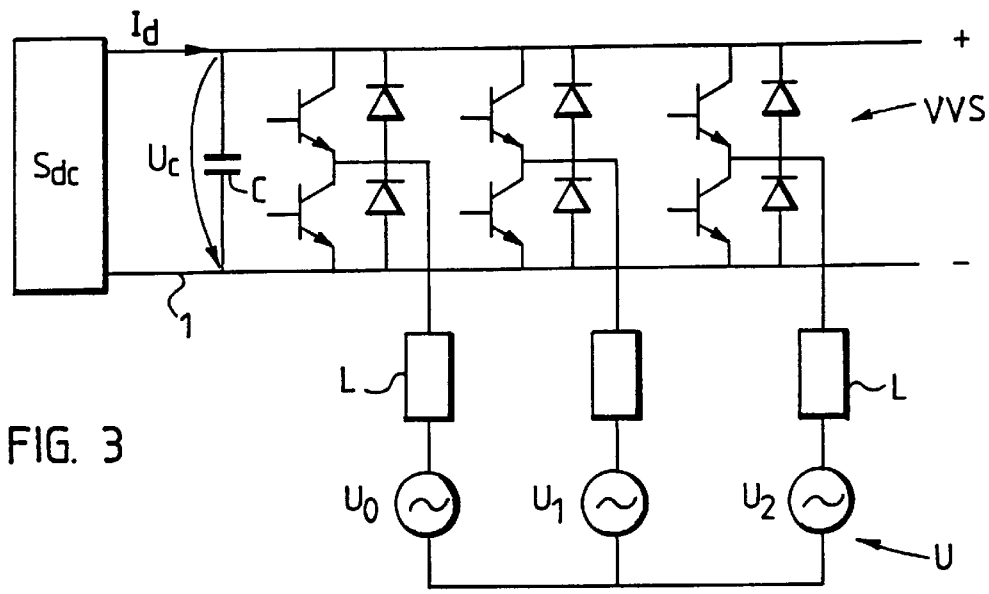
Figure 4:
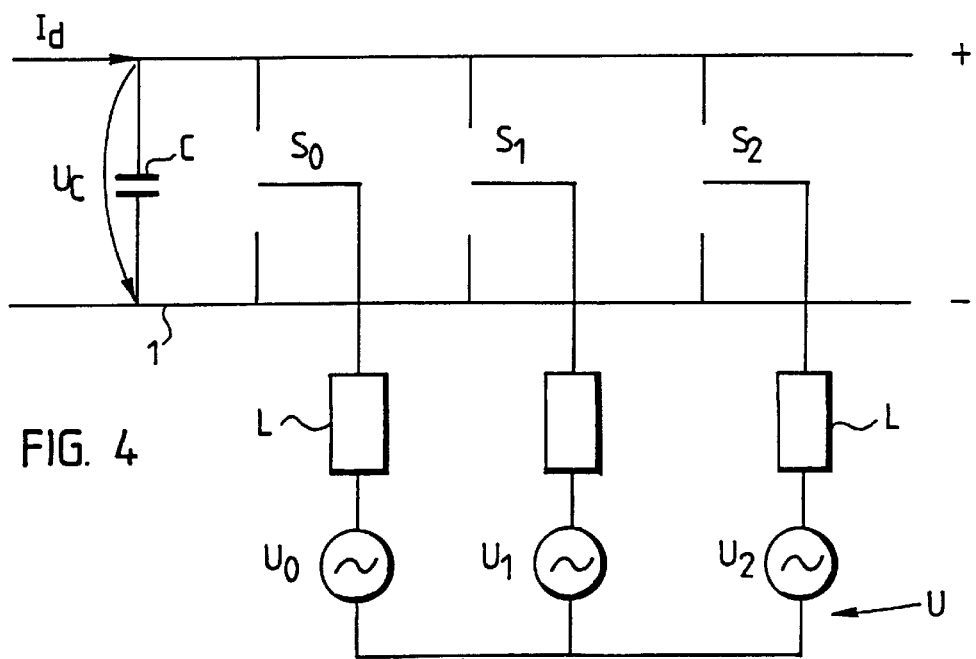
Figure 5:
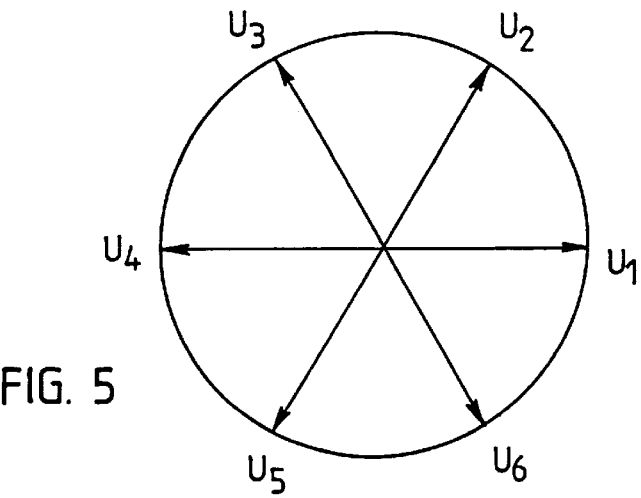
Figures 7, 8:
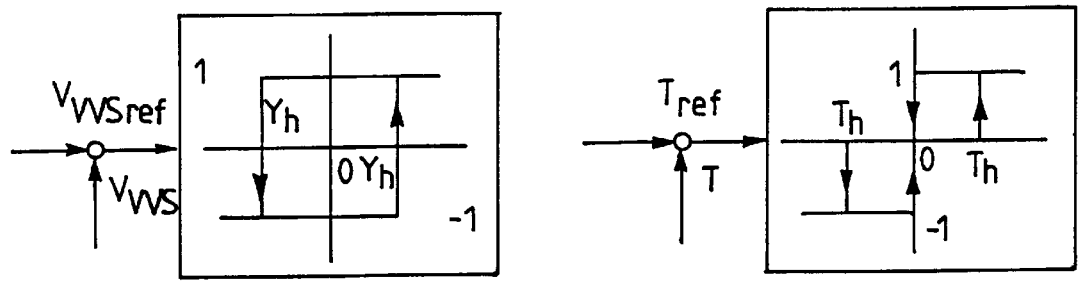
Figure 6:
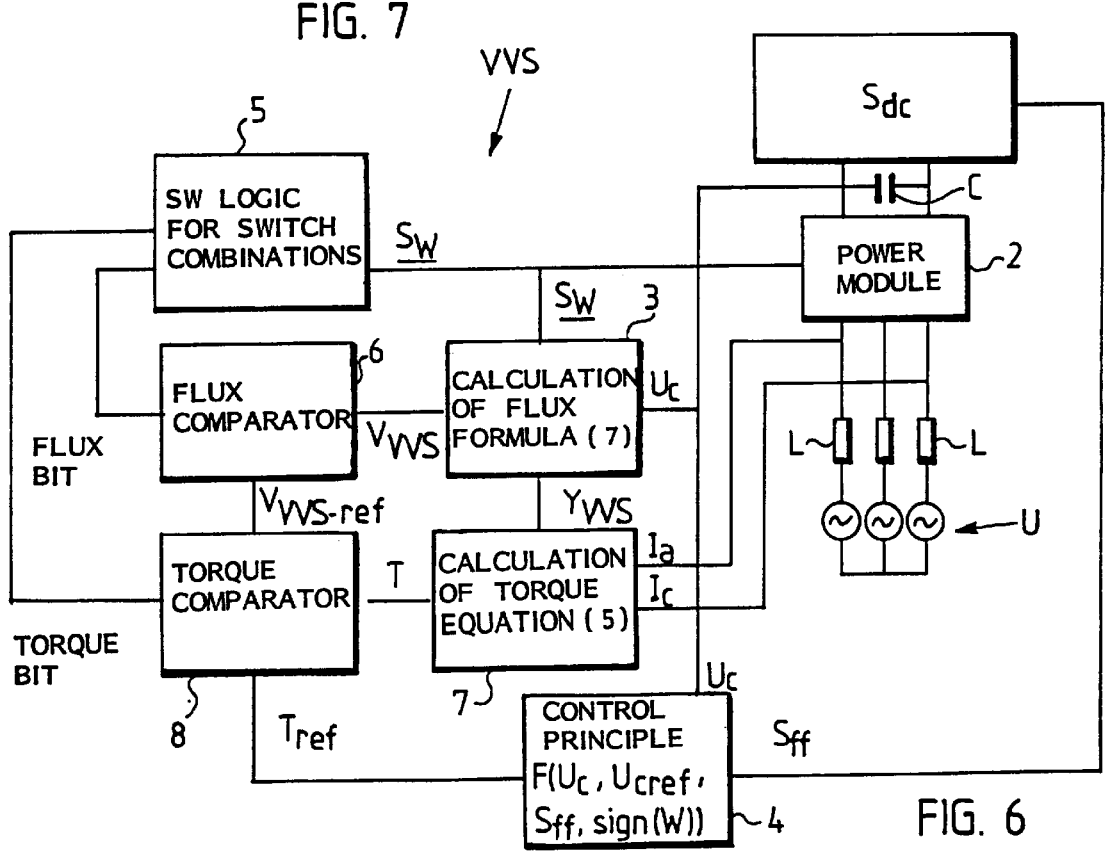

In the following, the method of the invention will be described in more detail with reference to the accompanying drawing, in which FIG. 1 is a schematic view of the interconnection of two electromotive systems, FIG. 2 illustrates the electric variables acting in the system according to FIG. 1 as a pointer drawing, FIG. 3 illustrates a more concrete embodiment of the system according to FIG. 1, FIG. 4 illustrates the nature of the system according to FIG. 3, FIG. 5 shows the voltage vectors produced by the system according to FIG. 4, FIG. 6 shows a block diagram illustrating the method of the invention, FIG. 7 shows in more detail the operation of the flux comparator included in the block diagram of FIG. 6, and FIG. 8 shows in more detail the operation of the torque comparator included in the block diagram of FIG. 6.

FIG. 3 shows as a diagram a system a part of which the mains inverter controlled by the method of the invention is. The block diagram of FIG. 3 comprises an AC mains U, which is shown as having three phases, comprising phase voltage sources U0, U1 and U2. These phases of AC mains U are connected to the inputs of the corresponding phases of a mains inverter VVS via reactors L. In each phase, the actual mains inverter consists of two controlled semiconductor switches and and two diodes connected parallel to them. In this manner, the mains inverter can be used as a diode bridge when not controlled, and when controlled, it can be used for affecting the power transferred via the mains inverter typically by affecting the level of the direct voltage Uc of the DC intermediate circuit. This direct voltage acts between the positive and negative poles of the mains inverter as well as in the poles of the capacitor C connected on the DC side. A system Sdc is connected as a load for the DC circuit.

The primary object of the method of the invention is to control the flow of the power of mains inverter VVS in such a manner that the DC voltage level Uc of DC intermediate circuit 1 remains as desired. In the method of the invention, in connecting mains inverter VVS to another AC electromotive force, in this case to AC mains U, the amplitude and frequency of the voltage of which mains inverter VVS cannot affect independently, voltage Uc of the intermediate circuit is selected as the primary control variable, it being attempted to regulate this voltage Uc to a desired reference value Uc-ref. Since the angular frequency ω of the AC mains is known, the power Pref that is desired to be transferred between the electromotive force of the AC mains and the electromotive force of the mains inverter can be replaced by a torque reference Tref in the stationary state. As distinct from what has been described above, the method of the invention can also be applied to a case in which the object is not to control the DC voltage level of the DC intermediate circuit but for instance merely to control the power transferred to the main system, the DC intermediate circuit thus acting as an energy supply, whereby it is not necessary or even possible to try to keep its voltage level constant.

It should be noticed that the DC voltage level Uc generated by mains inverter VVS corresponds to the length of the voltage vector Uvvs of the electromotive force shown in FIGS. 1 and 2 of the drawing. Since the length of the voltage vector is directly determined by the length of the flux vector, and since it is desirable that mains inverter VVS operates by a power factor 1.0, i.e. cos phi=1.0, the length of this flux-vector according to FIG. 2 can be determined by equation (6).

$$|\underline{V}vvs| = \sqrt{|\underline{V}v|^2 + |\underline{i}*L|^2} \qquad (6)$$

In the three-phase system, the unequivocality of current is ensured by the measurement of two phase currents. Correspondingly, in the n-phase system, it is only necessary to measure n−1 phase currents to determine the unequivocality of current. To form a voltage vector, the measurement of the DC voltage of the intermediate circuit for determining the length of the voltage vector and data on the position of the mains inverter switches at that particular time instant are required. This switch combination can be described by means of a vector Sw, the dimension of which is determined by the number of available electrotechnical component combinations that can be interpreted as switches. As seen in FIG. 4, which especially illustrates the operation of the inverter section of FIG. 3, three switches S0, S1 and S2 can be used in the inverter of the three-phase system according to the example, each of these switches having two positions; that is, a switch can be connected either to the lower branch, i.e. to the negative pole of the DC potential, or to the upper branch, i.e. to the positive pole of the DC potential. The magnitudes and directions of the possible voltage vectors produced in this manner are shown in FIG. 5. The result of this are six different voltage vectors, because two vectors in which all the switches are connected either to the lower branch or to the upper branch are reduced to zero vectors to the origin. This switch combination can be described by vector Sw=[state (S0), state (S1), state (S2)], in which state is a function which indicates the data on the switch position; that is, whether it is connected to the upper or lower branch, i.e. to the negative or positive pole of the DC potential. By utilizing voltage Uc of the intermediate circuit and vector Sw in the manner described above, the flux generated by mains inverter VVS can be calculated by means of formula (7).

$$Vvvs = \int Uc(Sw)dt + V0 \qquad (7)$$

in which V0 is the origin of the integration of the flux.

FIG. 6 shows a block diagram of the system suitable for the implementation of the method of the invention. In this system, as well as in the system according to FIG. 3, the mains inverter is connected between AC mains U and DC system Sdc in such a manner that reactors L are provided between AC mains U and power module 2 of the mains inverter, and capacitor C connected over the DC voltage is provided between power module 2 and DC system Sdc. Since the voltage Uc of the DC intermediate circuit is typically preferably adjusted to a desired value in the method of the invention, this voltage is measured and applied to blocks 3 and 4 of mains inverter VVS. Block 4 is a part of the control system, determining torque reference Tref in accordance with control principle F(Uc, Ucref, Sff, sign(ω)) prevailing in a given system. As can be noticed from the definition of the control principle, the definition of torque reference Tref is carried out by means of data on voltage Uc of the DC intermediate circuit at a given moment, reference value Ucref of this voltage, positive feedback variables Sff taking especially into account the quality of the DC system, and switching sequence of the phases of the AC electric system voltages as seen with regard to VVS (sign(ω)). If the method of the invention is applied to an arrangement in which the voltage level of the intermediate circuit is allowed to vary in the manner determined by system Sdc, the control principle can be replaced by another control principle G, which defines the torque reference as depending on for instance solely external positive feedback variables or power reference Pref desired to be transferred between the DC and AC circuits. The flux Vvvs generated by the mains inverter is calculated in block 3 by using formula 7 on the basis of said intermediate circuit voltage and the switch combination data Sw of power module 2 obtained from block 5, the data on the voltage of the intermediate circuit being also applied to block 3. This data on the flux generated by the mains inverter is applied to a flux comparator circuit 6 and to a block 7, which determines a torque T generated by the mains inverter by means of formula (5) on the basis of said flux data and current data Ia and Ic measured from two phases of AC mains U. The data on this torque T as well as the data on the reference value Tref of the torque from block 4 is applied to a torque comparator block 8, in which the actual torque and its reference value are compared with each other with the intention to generate control signals for block 5, which controls the switch positions of power module 2, this control signal adjusting the switch positions of the mains inverter in the direction increasing or decreasing the torque, depending on the result of the comparison. This torque bit may have three different values, as will be described in more detail in connection with FIG. 8.

Block 6 includes a flux comparator, in which the flux length determined in block 3 on the basis of equation (7) and the flux reference value Vvvs-ref obtained from block 8 for instance on the basis of equation (6) are compared with each other. On the basis of this comparison, a control signal, a so-called flux bit, is determined, by means of which the logic controlling the switch positions of power module 2 is adjusted in the direction either increasing or decreasing the flux. This flux bit may have two different values, as will be described in more detail in connection with FIG. 7.

The operation of flux comparator 6 in connection with the generation of the so-called flux bit is shown in more detail in FIG. 7. The calculated actual flux value Vvvs, on the one hand, and the reference value Vvvs-ref of this flux, on the other hand, are applied to this comparator. According to FIG. 7, the result of this comparison may have two values, either −1 or 1, depending on which of the values Vvvs and Vvvs-rf is higher. If the calculated flux value Vvvs is lower than the flux reference value Vvvs-ref, the flux bit value 1 increasing the flux should be selected. This flux bit value which increases the flux is retained as long as the calculated flux value Vvvs is higher than the flux reference value by hysteresis Vh. Correspondingly, if Vvvs is higher than Vvvs-ref, and the flux bit value −1 decreasing the flux should thus be selected, this flux bit value will be retained until Vvvs is lower than the flux reference value Vvvs-ref by hysteresis Vh.

FIG. 8 shows in more detail the operation of torque comparator 8. This torque comparator 8 compares torque reference value Tref, determined; in block 4 on the basis of the control principle, and the actual torque T, generated by the mains inverter and calculated by means of formula (5) in block 7, with each other. In accordance with FIG. 8, the torque bit resulting from the comparison has three levels, thus being able to have three different values in principal. If the torque reference value Tref is higher than the determined torque T, the value 1 increasing the torque is selected as the torque bit value. When a situation arrives in which both the actual and reference values of the torque are equally high, the value of the torque bit changes to 0. The value of the torque bit is retained in this value 0 as long as the difference of the actual and reference values of the torque does not exceed hysteresis value Th in either direction. When the torque bit value is 0, a zero pointer (i.e. a switch combination the vector representation of which is reduced to zero) is in use, the flux thus standing still in accordance with equation (7). If, however, the determined torque T is higher than the torque reference value Tref, the torque bit value −1 decreasing the torque is selected. The hysteresis Th of the torque comparator can be selected to be zero, whereby the value zero of the comparator is not realized, but a shift is made from the torque bit value −1 to the value 1, and vice versa.

As stated above, the two bit states controlling the flux and the torque are applied to logic 5 selecting the switch positions, this logic selecting the switch combinations that can be used in power module 2 in such a manner that the directions of change of the flux and torque provided by the bit states are taken into account appropriately, i.e. that the switch combination is such that it begins to implement the objective represented by the bit states of the flux and torque with regard to the flux and torque. As its output, this logic 5 produces the switch combination implemented at power stage 2. The number of possible switch combinations is the number of switch positions raised to the power according to the number of switches. In the case of FIG. 4, in which the number of switches is 3, and each switch has two positions, the number of possible switch combinations is 2 to the power of 3, i.e. 8. If the number of the AC mains phases is n, and each switch of the mains inverter has two positions, the number of possible switch combinations is $2^n$.

The advantages of the method of the invention are for instance extremely good dynamic qualities, which ensure the intermediate circuit voltage to be stabilized very quickly during load changes without the intermediate circuit voltage deviating very much from the given voltage reference value during this time. When applying the method of the invention, mains reactor L can be selected to be fairly small, for instance about 5% p.u. (per unit), in comparison with the previous mains inverter solutions, in which the mains reactor has typically been about 10–20% p.u.. Despite the small mains reactor, the distortion components of the current are small. By means of the two-point adjustment of the invention, the capacitor C of the intermediate circuit can also be reduced.

The modulation is implemented in a simple manner when compared with the conventional pulse width modulations (PWM). It is not necessary to generate any special reference waves for determining the used switch positions, but it is possible to accomplish the control directly in the mains inverter on the basis of the actual values of the flux and torque prevailing at a given time instant. In other words, the method of the invention dispenses with the need for unnecessary intermediate stages for generating the correct voltage and frequency in the mains inverter, these variables being generated directly with the two-point adjustment.

The fact that the method of the invention entails few measurements in comparison with the previous mains inverter solutions can also be mentioned as an advantage. In the method of the invention, phase voltages of the AC mains are not measured at all, but all that is required is the measurement of the DC voltage of the intermediate circuit and n−1 current measurements, by means of which the current of the n-phase AC mains is determined unequivocally.

The method of the invention has been illustrated above only by means of some exemplifying embodiments, and it will be apparent that the method of the invention can also be applied in systems the block diagrams of which and the blocks selected to these block diagrams differ essentially from the block diagram shown as an example in FIG. 6.

We claim:

1. A method for regulating power transfer in both directions through an inverter between a DC intermediate circuit having a DC voltage and current carrying n-phase AC mains having in-line reactors, said inverter having a corresponding number n of current carrying branches, and controllable switches therein and a control system therefor being responsively coupled between the DC intermediate circuit and the reactors, the frequency and amplitude of the voltage of the AC mains being independent of the inverter, the method comprising the steps of:

defining in the control system reference values corresponding to respective reference torque and flux (Tref, Vvvs-ref) variables;

calculating in the control system calculated values corresponding to actual values of torque and flux (T, Vvvs) respectively by:

determining a current vector (I) of the inverter by measuring a current (Ia, Ic) of n−1 phases of the AC mains, determining a flux vector (Vvvs) by integrating a voltage vector defined on the basis of a voltage measurement (Uc) of the intermediate circuit and data on the switch positions of the inverter, and determining the torque (T) by performing a cross product of said current vector (I) and said flux vector (Vvvs);

comparing the reference values with the calculated values; and generating signals in accordance with the comparing step for adjusting the switch positions of the inverter in the direction increasing or decreasing the flux and correspondingly in the direction increasing or decreasing the torque.

2. A method according to claim 1 wherein generating the signals for adjusting the switch positions comprises producing a two-state signal.

3. A method according to claim 2 wherein producing the two-state signal comprises changing its state only when the actual and reference values to be compared differ from each other by a predetermined hysteresis (Yh).

4. A method according to claim 1, wherein generating the signals for adjusting the switch positions comprises producing a three-state signal.

5. A method according to claim 4, wherein producing the three-state signal comprises shifting to the state 1 or −1 when the difference of the actual and reference values is greater than a predetermined hysteresis (Th), and to the state 0 in other cases.

* * * * *